May 7, 1929.  P. H. MISTRAL  1,712,155
LIVE AXLE HAVING DRIVING WHEELS
Filed Dec. 6, 1927   2 Sheets-Sheet 1

P.H. Mistral
Inventor

Patented May 7, 1929.

1,712,155

UNITED STATES PATENT OFFICE.

PAUL HENRI MISTRAL, OF BOULOGNE-SUR-SEINE, FRANCE.

LIVE AXLE HAVING DRIVING WHEELS.

Application filed December 6, 1927, Serial No. 238,186, and in France December 7, 1926.

The present invention has for its object a live axle provided with a differential but having four driving wheels, two of which are secured on the shafts of the planetary gears and the other two are secured on the shells of the differential and are not subjected to the influence of the latter, since they are rigid with each other.

As these four wheels can vary in the vertical direction, it is thus possible to cause either the outer wheels alone to bear on the ground, or the central wheels, thus leaving the weight of the vehicle to be supported by the outer wheels or by the central wheels, or again by the four wheels at the same time.

The central wheels can be provided with projections for increasing their adherence, this efficiency of adherence thus correcting the tendency to skidding of the outer wheels controlled by the differential.

Owing to the connection and positioning of the outer wheels at the rear of the center of the live axle, the rising of the vehicle on inclines and upon sudden starting is eliminated.

In order that the invention may be clearly understood, the device forming the subject-matter of the present invention is illustrated, but by way of example only, in the accompanying drawing in which.

Figure 1:
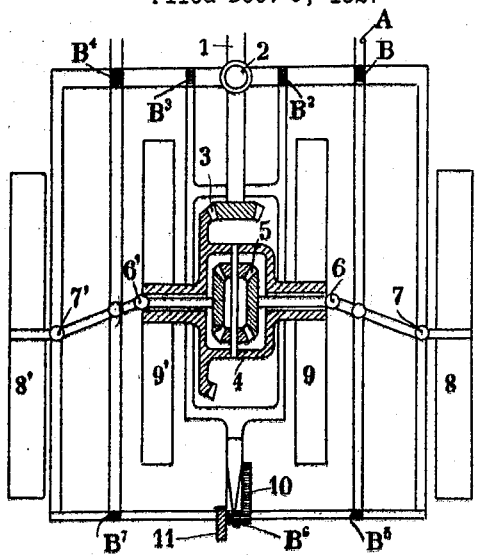
Fig. 1 is a general plan view.
Figure 2:
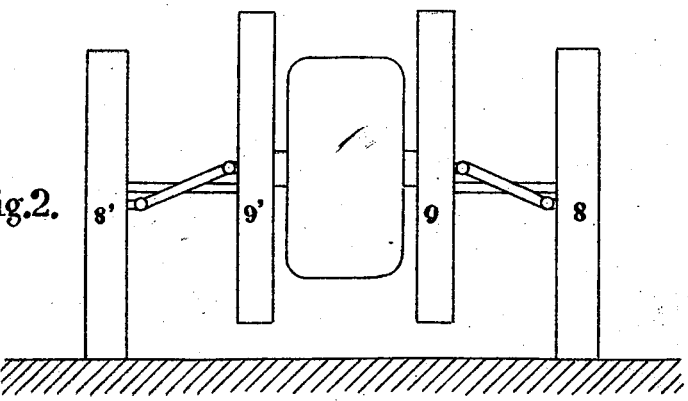
Fig. 2 is a rear view with the central wheels raised and the outer wheels alone acting as carrying wheels.
Figure 3:
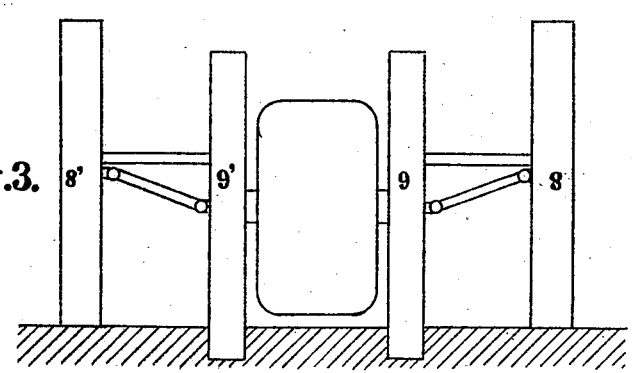
Fig. 3 is a rear view with the outer wheels raised and the central wheels on the ground for ensuring the propulsion.
Figure 5:
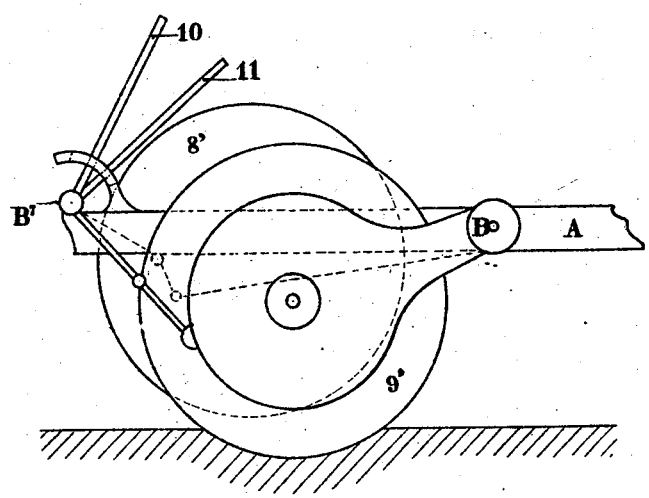
Fig. 5 is a side view with the central wheels lowered.
Figure 4:
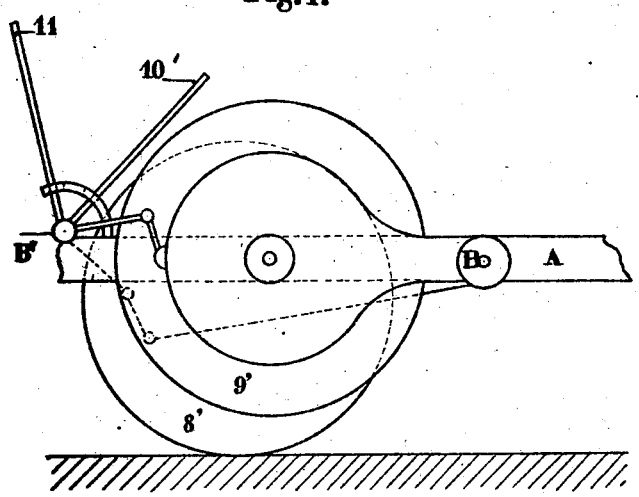
Fig. 4 is a side view with operating levers (the central wheels being raised).

This apparatus is substantially composed of a live axle secured on a frame A and driven by a driving shaft 1 provided with a Cardan joint 2 and actuating a bevel gear 3 meshing with the gear on the shell 4 of the differential 5.

On the planet wheels of this differential 5 are mounted the shafts provided with Cardan joints 6 and 6', 7 and 7' which actuate the outer wheels 8 and 8'. The latter might also be driven by chains.

The ends of the shell 4 of the differential fixedly carry the wheels 9 and 9' which are consequently rigid with each other.

The lever 10 causes the wheels 8 and 8' to move vertically through the joints B, $B^4$, $B^5$ and $B^7$.

The lever 11 causes the entire live axle to move as well as the wheels 9 and 9' through the joints $B^2$, $B^3$, $B^6$.

The operation is as follows:

When a motor vehicle, car, lorry, or tractor provided with this live axle runs on a hard road, the outer driving wheels 8 and 8' are sufficient for the propulsion and the wheels 9 and 9' idly rotate without touching the ground, but on a soft ground, it frequently happens that the resistance encountered by the wheels 8 and 8' not being equal, one of them is immobilized and the other skids on the spot owing to the operation of the differential.

At this moment, the driver, by means of the lever 11, will lower the live axle and the central wheels 9 and 9', then, by means of the lever 10, he will raise more or less the outer wheels 8 and 8'. The weight of the vehicle will then bury into the ground the projections of the central wheels and will give, from this fact, the necessary adherence corresponding to the condition of the ground, thus correcting the effects of the differential; owing to their position at the rear of the center of the live axle, the wheels 8 and 8' prevent the vehicle from rising in inclines and upon sudden startings.

Claims:

1. A live axle including a differential, a shell therefor, two outer driving wheels connected to and controlled by the differential, and two central driving wheels secured on the shell of the differential and consequently rigid with respect to each other.

2. A live axle as claimed in claim 1, wherein the connection between the outer wheels and the differential embodies relatively movable parts to permit of the vertical variation of the central wheels with respect to the outer wheels to hereby allow the weight of the vehicle to be supported by the outer wheels alone or by the central wheels or by the four wheels at the same time.

3. A live axle as claimed in claim 1, wherein the outer wheels are arranged slightly rearwardly of the central wheels and wherein the connection between the outer wheels and differential is such that when the central wheels are being adjusted a variation is effected in the distance between the longitudinal axis of the central wheels relative to the outer wheels, substantially as and for the purposes set forth.

The foregoing specification of my "live axle having four driving wheels" signed by me this 25th day of November, 1927.

PAUL HENRI MISTRAL.